R. C. HAWKINS.
WATER VALVE GEAR FOR PUMPS.
APPLICATION FILED NOV. 1, 1919.
1,338,443.
Patented Apr. 27, 1920.
3 SHEETS—SHEET 1.
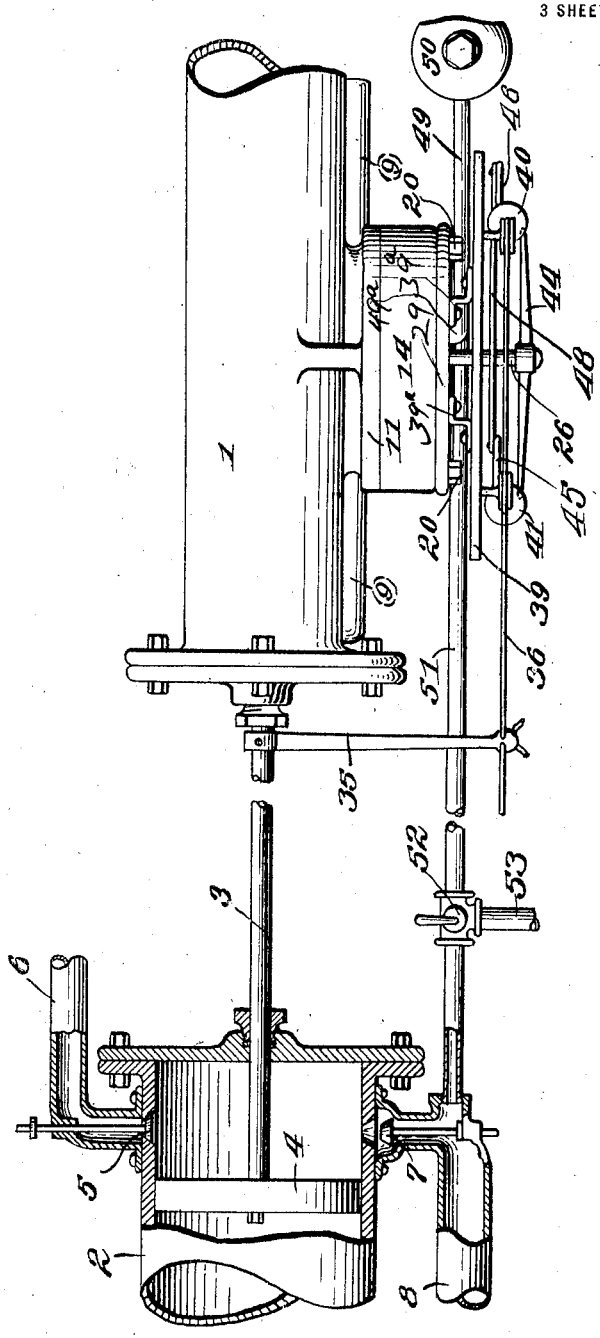
Inventor:
Rubin C. Hawkins
by John C. Higdon
Atty.

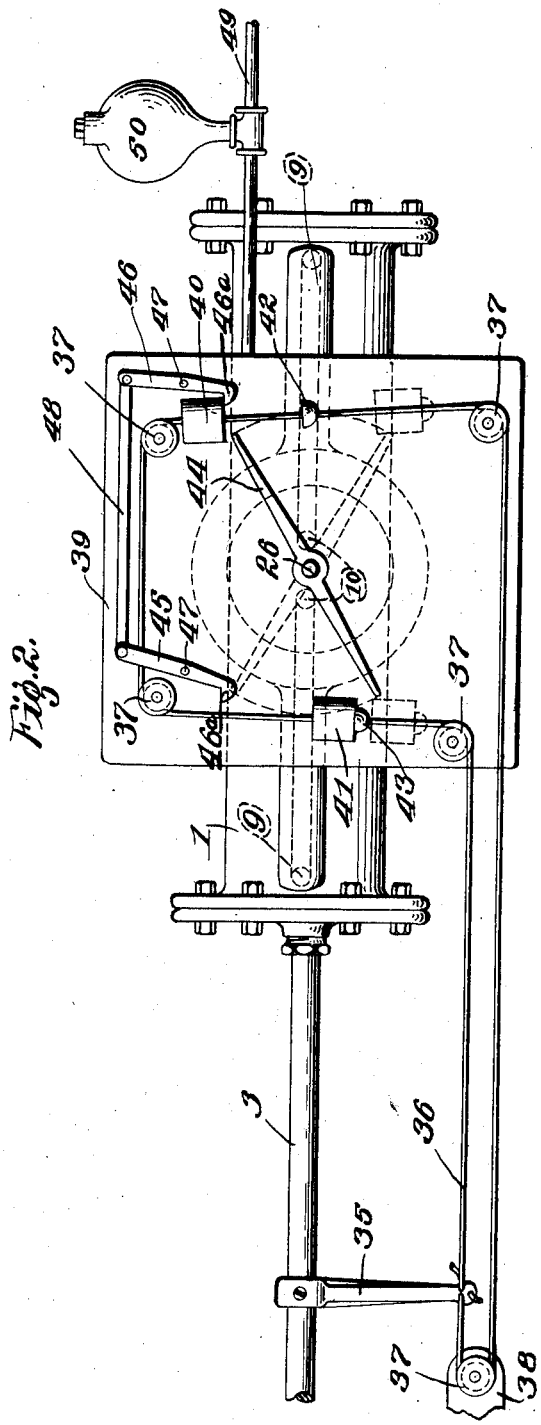

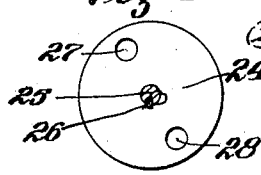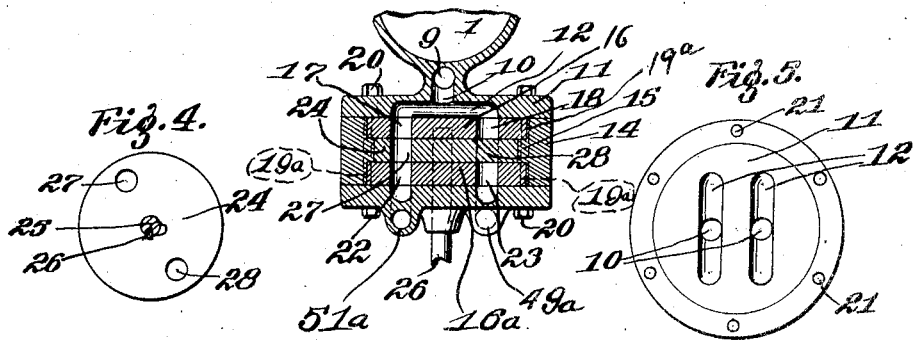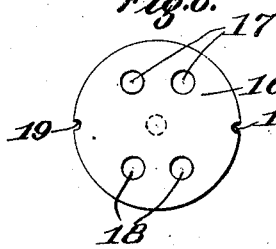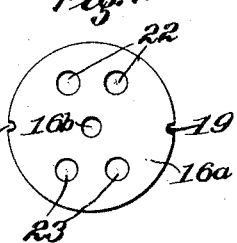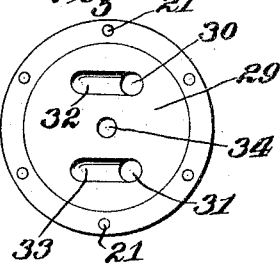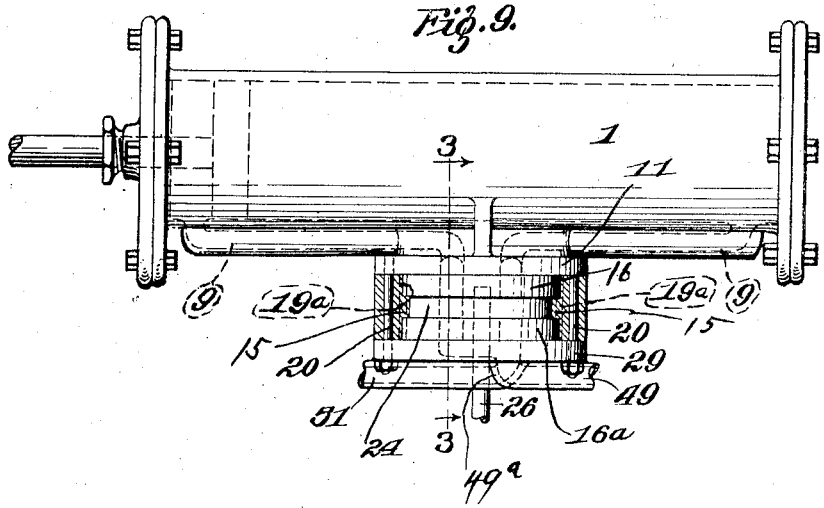

UNITED STATES PATENT OFFICE.

RUBIN C. HAWKINS, OF ST. LOUIS, MISSOURI.

WATER VALVE-GEAR FOR PUMPS.

1,338,443.   Specification of Letters Patent.   Patented Apr. 27, 1920.

Application filed November 1, 1919. Serial No. 334,971.

*To all whom it may concern:*

Be it known that I, RUBIN C. HAWKINS, a citizen of the United States, residing at St. Louis, in the State of Missouri, have invented certain new and useful Improvements in Water Valve-Gears for Pumps, of which the following is a specification containing a full, clear, and exact description, reference being had to the accompanying drawings, forming a part hereof.

My invention consists in the novel disclosure that is hereinafter particularly described and distinctly claimed.

The object of my invention is to provide an improved water-actuated pump and water-actuated valve-gear therefor, whereby pumps may be driven by water-pressure direct (as distinguished from steam or other power) in such cases as are isolated a great distance from a steam-boiler, yet there is found (or can be supplied) an abundance of water under pressure sufficient to move the piston of the power-cylinder against a moderate pressure in the water-cylinder of the pump.

In the drawings,

Figure 1 is a top plan-view, partly in horizontal section, of the power-cylinder, the water-cylinder, and other parts of a horizontal pump, having my invention applied thereto.

Fig. 2 is a side-elevation of the power-cylinder and adjacent parts of the pump and valve-gear.

Fig. 3 is a vertical detail section, taken on the line 3—3 of Fig. 9.

Fig. 4 is a side-elevation of the rocking valve, removed from the valve-chest.

Fig. 5 is a side-elevation of the valve-chest base, showing the water passages in the inner side thereof.

Fig. 6 is a detail view of the inner face of the inner detachable valve-seat disk.

Fig. 7 is a similar view of the outer valve-seat disk.

Fig. 8 is a side-elevation of the inner face of the valve-chest cover, removed, and Fig. 9 is a sectional plan-view of parts of the power-cylinder, having the valve-chest, valve-seat disks, and valve, assembled.

The numeral 1 designates the power-cylinder of the pump, and 2 the water-cylinder connected to said power-cylinder by the usual piston-rod 3, and frame or base (not shown), and both cylinders are provided with common pistons, as 4, so that when the piston of the said power-cylinder is moved by the pressure of water behind it there will be a corresponding movement of said water-cylinder piston, and the suction or inlet-valve or valves 5 of said water cylinder will open and allow water to enter by way of the inlet or suction-pipe 6, and be discharged in the usual manner by way of the discharge-valve 7 into the discharge-pipe 8, sometimes called the service-pipe.

Said power-cylinder 1 is formed with the usual ports 9 for permitting the pressure-water to pass into and to be exhausted from the said cylinder through two ports 10 in the valve-chest 11.

Said valve-chest base 11 is provided with two parallel ports or grooves 12 in its outer face, which grooves connect with the said two ports 10, to permit the pressure-water to pass into and out of the power-cylinder from the interior of said valve-chest.

Said valve-chest is composed, in the present illustration of my invention, of a casing in the form of a cylinder or ring 14 having an annular shoulder or abutment 15 upon its interior at about midway of its length; an inner fixed valve-seat disk 16 having two pairs of ports or openings 17 and 18 and diametrically-opposite recesses 19 which are engaged by opposite ribs 19ª (or which may engage opposite bolts 20 which fasten parts of the chest together and to the power-cylinder 1) to act as guides and to prevent rotation of said seat-disk 16, there being holes 21 for said bolts 20; an outer fixed valve-seat disk 16ª having two pairs of ports or openings 22 and 23, and having a central opening or bearing 16ᵇ and diametrically-opposite recesses 19 to prevent its turning by engagement with said opposite ribs 19ª on the interior of said valve-chest casing 14; a rocking valve-disk 24 which is seated between the two fixed disks 16 and 16ª and provided with two ports or passages 27 and 28 and secured upon a valve-stem 26 by means of a key 25 or other common means; and a valve-chest cover 29 through which are formed ports or passages 30 and 31, and upon the inner face of which is a groove 32 in communication with said port 30, and a groove 33 which is in communication with the other port 31. (See Figs. 3 to 8 inclusive).

A valve-stem bearing or passage 34 is formed centrally of the said valve-chest cover 29, so that the valve-stem 25 may project a distance upon the exterior of the valve-chest.

Motion is communicated to the valve 24 by an arm 35 clamped upon said piston-rod 3 and arranged to move back and forth a rope or cable 36 which runs upon a common grooved-pulley 37 mounted upon some suitable part 38 of the pump frame or base, and thence running under two additional pulleys 37, 37 mounted near the lower edge of a vertical pulley-plate 39 that is set on edge near the valve-chest and secured thereto by common supporting-brackets 39ª.

Said rope or cable 36 is in the form of an endless belt, which is attached to the lower portion of the said piston-rod arm 35, in any suitable manner, as shown in Figs. 1 and 2 if so desired, and said rope or cable is passed upwardly in a line that is slightly inclined inwardly at its upper end, to a point near the upper edge of said pulley-plate 39, where said rope or cable passes over two additional pulleys 37 that are in the same horizontal plane, but separated a distance, so that the inclined upwardly extending lines of said rope or cable will be separated a considerable distance.

On each of said vertical or upwardly extending lines of said rope or cable 36 a heavy weight of cast-iron or other suitable material is loosely mounted to slide and be dropped, the weight on one of said lines being designated by the numeral 40, while the weight on the opposite line is marked 41.

A suitable stop or abutment 42 is fixed on one of said vertical lines of said cable 36 at a distance beneath the said weight 40, when the latter is at the limit of its upward movement, so that said weight may be dropped upon the adjacent end of a rock-arm 44 that is fixed upon the said valve-stem 26, and thereby move said valve-stem and the valve 24 quickly in one direction.

After said weight 40 has been dropped it first moves the said adjacent end of said rock-arm 44, and then comes into contact with its said stop 42 and is supported thereby until it is again elevated by the movement of said rope or cable.

For quickly moving said rock-arm 44 in a reverse direction, another weight 41 is mounted upon the opposite vertical line of said rope or cable 36 above a stop 43 carried by said line.

Said weights 40 and 41 are alternately raised and dropped, and one of them is in contact with, and is supported at all times by its stop until it is carried into a position to be elevated, and has been elevated to the limit of its upward movement, which elevation is accomplished at a comparatively slow rate of movement of the said rope or cord 36, upon the reverse movement of said piston-arm 35, as the piston-rod 3 makes a stroke.

For alternately catching and dropping, the said weights 40 and 41, rocking-dogs 45 and 46 are pivotally-mounted at 47 upon said pulley-plate 39, one dog adjacent said weight 40 when at the limit of its upward movement, and one dog near to the other weight 41, and the lower end of said dogs is provided with a supporting-hook 46ª which is moved beneath said weights and supports them until said hook is detached from its weight, whereupon said weight falls and moves said rock-arm 44, in the manner previously referred to.

The under edge of the said dog-hooks 46ª is rounded, to act as a cam, which is engaged by the ascending weight, to move both dogs simultaneously in dropping the opposite weight, the upper ends of both dogs 45 and 46 being pivotally connected by a horizontal bar 48.

In Fig. 2, the weight 40 (at the right-hand) is ready to be dropped, and will be dropped as soon as the other weight 41 reaches and pushes to the right the cam-shaped hook 46 of its dog 45, after which the overbalancing weight of the upper parts of both dogs (as well as the weight of said horizontal bar 48) will cause the hook of said dog 45 to pass beneath and support said weight 41 in the manner in which the opposite weight 40 is shown supported by its dog-hook, and so on, as the weights rise and fall by the reciprocation of the piston-rod 3 during the operation of the pump.

Water under sufficient pressure is supplied to the valve-chest of the power-cylinder 1 through a suitable supply-pipe 49, which should be fitted with a common air-chamber 50, to prevent the shock that would otherwise be produced by the sudden stoppage of the flow of water by said valve 24, in cutting off the supply from one end of said power-cylinder and transferring it to the opposite end thereof, particularly if the pump is running at considerable speed.

The said supply-pipe 49 is connected to a supply-pipe connection 49ª on the exterior of said valve-chest cover 29, while the exhaust-pipe 51 is attached to an exhaust-pipe connection 51ª formed upon said cover just below said supply-pipe connection. (See Fig. 3.)

The exhaust-water may be discharged into the atmosphere and allowed to run to waste, or it can be utilized by connecting said exhaust-pipe 51 to the service-pipe 8 of the pump-cylinder 2, as shown in Fig. 1, provided the pressure in said service-pipe is sufficiently low to permit the operation just mentioned without throwing too much back-pressure upon the piston of the said power-cylinder 1, which will hardly ever occur, inasmuch (as previously stated in the above paragraph reciting the object of my invention) my invention is designed to operate under a moderate pressure in the water-cylinder of the pump.

In order to permit the exhaust-liquid to run to waste, or to be saved, as desired, and as water is abundant or scarce, I provide an ordinary three-way cock or valve 52 in said exhaust-pipe 51 at a point between the valve-chest and the said service-pipe 8, so that by manipulating said cock or valve the exhaust-water may be directed into a waste-pipe 53, or into said service-pipe.

*The operation of the valve in the valve-chest.*

The actuating-fluid, water or other fluid under a sufficient pressure, enters the valve-chest from said supply-pipe 49, by way of said pipe-connection 49ª the interior of which is (of course) in communication with the interior of the chest which contains said valve 24 and its seat-disks 16 and 16ª.

Said pipe-connection 49ª is, in other words, in direct communication with the said port or opening 30 (which is the inlet opening) and the inlet groove 32 of the valve-chest cover 29; and said inlet-groove is at all times in communication with the pair of ports or inlet-openings 22 of the said outer fixed valve-seat disk 16ª, which are ready to deliver fluid to the inlet-port 27 of said rocking valve-disk 24, no matter whether the latter be positioned to deliver fluid to one end of the power-cylinder 1 or the opposite end thereof.

The fluid passes through said inlet-port 27 of said rocking valve-disk 24 into which-ever one of the ports 17 of the inner fixed valve-seat disk 16 that registers with said valve-disk port 27, so that as said valve-disk is rocked during the operation of the pump, the actuating-fluid will be delivered to first one end of said power-cylinder and then to the other end thereof, and thereby cause the piston of said power-cylinder 1 to be moved or reciprocated as usual, with the usual result of operating the piston of said water-cylinder 2 and pumping water and discharging same into said service-pipe 8.

Such action is accomplished because, as previously recited in the detail description, the said base 11 of the valve-chest is provided with two separate ports 10, one of which communicates with one end of the power-cylinder 1, through a cylinder-port 9, while the other port 10 communicates at all times with the cylinder-port of the opposite end of said cylinder, so that as the actuating-fluid passes from one or the other of said ports 17 of said inner fixed valve-seat disk 16, it will pass into one or the other of said separated ports 10 of said valve-chest base by way of the appropriate groove 12 of said base, and thence to the proper end of said power-cylinder. (See Fig. 5).

The exhaust is accomplished whenever the position of said rocking valve-disk 24 is such that its exhaust-port 28 registers with the appropriate one of said exhaust-ports 18 of said fixed inner valve-seat disk 16, which permits a direct passage for the exhaust-fluid from one end of the power-cylinder through the valve-chest to the said exhaust-pipe connection 51ª, as clearly shown in Fig. 3, the exhaust from the opposite end of said cylinder being blocked by said rocking-disk 24.

The said annular shoulder or abutment 15, upon the interior of the valve-chest casing, 14 acts as a seat for the outer fixed seat-disk 16ª, and prevents same from being clamped too tightly upon the said rocking valve-disk 24, by the action of the bolts 20 and their nuts.

I do not limit my invention to the exact form of parts herein shown and described, as numerous unimportant changes in same may be made by skilled mechanics without departing from the spirit of my invention, as defined by the appended claims.

I claim:—

1. A water-driven pump, comprising a power-cylinder, a pump-cylinder, pistons in said cylinders, a piston-rod which connects said pistons so they will move in unison, a valve-chest on said power-cylinder, there being suitable ports leading from the interior of said valve-chest to the interior of said power-cylinder on opposite sides of the piston thereof, two valve-seat disks provided with ports which register with said valve-chest ports, and removably fixed in said chest, a rockable disk having ports which are placed in communication with the ports of said two seat-disks as well as with the ports of said power-cylinder, said rockable disk being mounted in the space between the said two valve-seat disks, and adapted when rocked to distribute the power-water alternately to opposite ends of said power-cylinder and to control the exhaust-water therefrom; and means connected to some reciprocating part of the pump for rocking said disk.

2. The combination with the elements of the above claim 1, of a means for imparting a precipitate movement to the said rockable disk, whereby the same will be rocked at a speed greater than it would be were it connected to said reciprocating part of the pump directly.

3. The combination with the elements of the above claim 1, of means for discharging the exhaust-water from said power-cylinder into the discharge-pipe of said pump, whereby said exhaust-water will be utilized.

In testimony whereof I have signed my name to this specification in presence of two subscribing witnesses.

RUBIN C. HAWKINS.

Witnesses:
 IDA PHILLIPS,
 JOHN C. HIGDON.